US011951596B2

(12) United States Patent
Schneider et al.

(10) Patent No.: US 11,951,596 B2
(45) Date of Patent: Apr. 9, 2024

(54) ROTARY IMPACT TOOL

(71) Applicant: MILWAUKEE ELECTRIC TOOL CORPORATION, Brookfield, WI (US)

(72) Inventors: Jacob P. Schneider, Cedarburg, WI (US); Evan Brown, Milwaukee, WI (US); Benjamin J. Farley, Milwaukee, WI (US); Nathan P. Sievers, West Allis, WI (US); Braden A. Roberts, Brookfield, WI (US); John S. Dev, IV, New York, NY (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 17/394,845

(22) Filed: Aug. 5, 2021

(65) Prior Publication Data

US 2022/0040829 A1 Feb. 10, 2022

Related U.S. Application Data

(60) Provisional application No. 63/061,448, filed on Aug. 5, 2020.

(51) Int. Cl.
*B25B 21/02* (2006.01)
*B25F 5/00* (2006.01)

(52) U.S. Cl.
CPC ............ *B25B 21/023* (2013.01); *B25F 5/001* (2013.01)

(58) Field of Classification Search
CPC ... B25B 21/02; B25B 23/1475; B25B 21/026; B25B 21/023; B25F 5/02; B25F 5/001; B25F 5/00
USPC .............................................................. 173/2
See application file for complete search history.

(56) References Cited

U.S. PATENT DOCUMENTS

| | | | |
|---|---|---|---|
| 6,484,814 | B2 | 11/2002 | Bongers-Ambrosius |
| 9,321,159 | B2 | 4/2016 | May |
| 9,539,715 | B2 | 1/2017 | McClung |
| 9,993,916 | B2 | 6/2018 | Chen et al. |
| 10,272,550 | B2 | 4/2019 | Dey, IV et al. |

(Continued)

FOREIGN PATENT DOCUMENTS

| | | | |
|---|---|---|---|
| EP | 2447006 | A2 | 5/2012 |
| JP | 2004066413 | A | 3/2004 |

(Continued)

OTHER PUBLICATIONS

International Search Report and Written Opinion for Application No. PCT/US2021/044661 dated Nov. 23, 2021 (12 pages).

*Primary Examiner* — Jacob A Smith
(74) *Attorney, Agent, or Firm* — Michael Best & Friedrich LLP

(57) ABSTRACT

A rotary impact tool includes a motor housing, an electric motor supported in the motor housing, and a drive assembly for converting a continuous torque input from the motor to consecutive rotational impacts upon a workpiece. The drive assembly includes an anvil including an anvil lug and a hammer that is both rotationally and axially movable relative to the anvil. The hammer includes a hammer lug for imparting the consecutive rotational impacts upon the anvil lug. The rotary impact tool further comprises a printed circuit board assembly including a sensor that is configured to detect rotation of the anvil. The printed circuit board assembly is spaced from the anvil to define an axial gap therebetween.

13 Claims, 15 Drawing Sheets

(56) References Cited

U.S. PATENT DOCUMENTS

| | | | | |
|---|---|---|---|---|
| 10,583,545 | B2 | 3/2020 | Dey, IV et al. | |
| 2011/0058356 | A1* | 3/2011 | Friedman | B25F 5/021 362/119 |
| 2012/0234566 | A1 | 9/2012 | Mashiko et al. | |
| 2013/0021783 | A1* | 1/2013 | Vanko | B25B 21/00 362/119 |
| 2014/0262394 | A1 | 9/2014 | Scott et al. | |
| 2015/0000946 | A1 | 1/2015 | Amend et al. | |
| 2015/0014005 | A1 | 1/2015 | Puzio et al. | |
| 2015/0022125 | A1 | 1/2015 | Takano et al. | |
| 2017/0173768 | A1 | 6/2017 | Dey, IV et al. | |
| 2019/0022837 | A1* | 1/2019 | Dey, IV | B25B 21/02 |
| 2019/0030696 | A1* | 1/2019 | Seith et al. | B25B 21/02 |
| 2019/0118353 | A1 | 4/2019 | Woetzl et al. | |
| 2019/0171166 | A1 | 6/2019 | Zanesco et al. | |
| 2019/0232471 | A1 | 8/2019 | Paoli et al. | |
| 2020/0171632 | A1 | 6/2020 | Dey, IV et al. | |
| 2020/0215668 | A1 | 7/2020 | Duncan et al. | |
| 2021/0379743 | A1 | 12/2021 | Schneider et al. | |
| 2021/0394344 | A1 | 12/2021 | Mueckl et al. | |

FOREIGN PATENT DOCUMENTS

| | | | |
|---|---|---|---|
| JP | 2013215884 | A | 10/2013 |
| KR | 1020140106190 | A | 9/2014 |
| KR | 1020170035400 | A | 3/2017 |
| WO | 2018100802 | A1 | 6/2018 |
| WO | 2021016437 | A1 | 1/2021 |

* cited by examiner

ROTARY IMPACT TOOL

CROSS-REFERENCE TO RELATED APPLICATIONS

This application claims priority to U.S. Provisional Patent Application No. 63/061,448, filed Aug. 5, 2020, the entire content of which is incorporated herein by reference.

FIELD OF THE INVENTION

The present invention relates to power tools, and more specifically to rotary impact tools.

BACKGROUND OF THE INVENTION

Rotary impact tools utilize a motor and a drive assembly for converting a continuous torque input from the motor to consecutive rotational impacts upon a workpiece. Some rotary impact tools include an electric motor and an onboard battery for powering the electric motor.

SUMMARY OF THE INVENTION

The present invention provides, in one independent aspect, a rotary impact tool comprising a motor housing, an electric motor supported in the motor housing, and a drive assembly for converting a continuous torque input from the motor to consecutive rotational impacts upon a workpiece. The drive assembly includes an anvil including an anvil lug and a hammer that is both rotationally and axially movable relative to the anvil. The hammer includes a hammer lug for imparting the consecutive rotational impacts upon the anvil lug. The rotary impact tool further comprises a printed circuit board assembly including a sensor that is configured to detect rotation of the anvil. The printed circuit board assembly is spaced from the anvil to define an axial gap therebetween.

The present invention provides, in another independent aspect, a rotary impact tool including a motor housing, an electric motor supported in the motor housing, and a drive assembly for converting a continuous torque input from the motor to consecutive rotational impacts upon a workpiece. The drive assembly includes an anvil including an anvil lug, and a hammer that is both rotationally and axially movable relative to the anvil. The hammer includes a hammer lug for imparting the consecutive rotational impacts upon the anvil lug. The rotary impact tool further includes a first printed circuit board assembly including an anvil sensor that is configured to detect rotation of the anvil and a second printed circuit board assembly including a hammer sensor configured to detect at least one selected from a group consisting of: (a) translation of the hammer; (b) rotation of the hammer; and (c) occurrence of an impact between the hammer and the anvil.

The present invention provides, in another independent aspect, a rotary impact tool comprising an impact housing and a drive assembly at least partially supported within the impact housing and configured to convert a continuous torque input to consecutive rotational impacts upon a workpiece. The drive assembly includes an anvil including an anvil lug, a drive end opposite the anvil lug, and a target disposed between the anvil lug and the drive end, and a hammer that is both rotationally and axially movable relative to the anvil, the hammer including a hammer lug for imparting the consecutive rotational impacts upon the anvil lug. The rotary impact tool further includes a printed circuit board assembly including an anvil sensor that is configured to detect rotation of the anvil, and the printed circuit board assembly is spaced from the target to define an axial gap therebetween.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
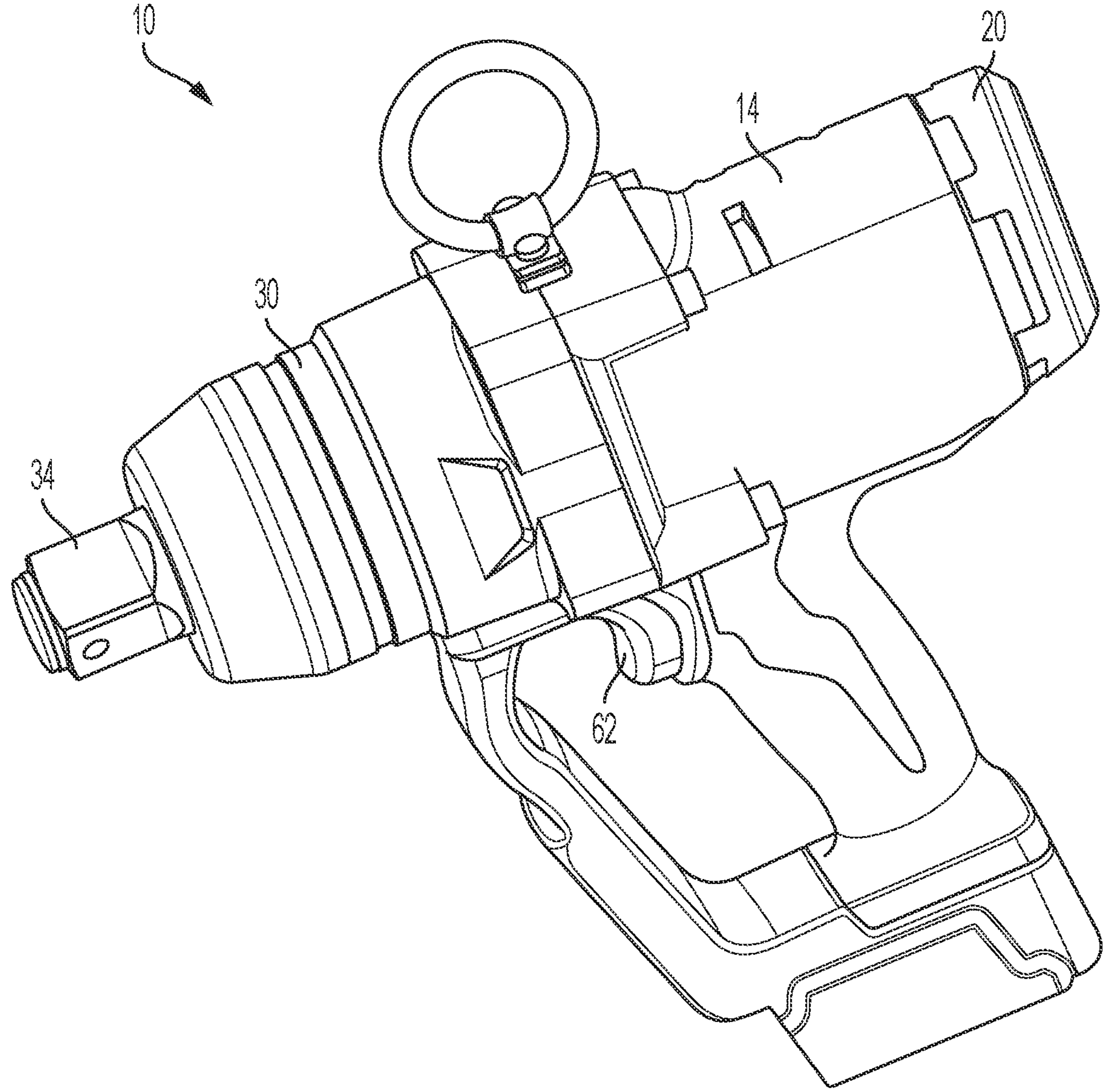
FIG. 1 is a perspective view of a rotary impact tool in accordance with an embodiment of the invention.
Figure 2:
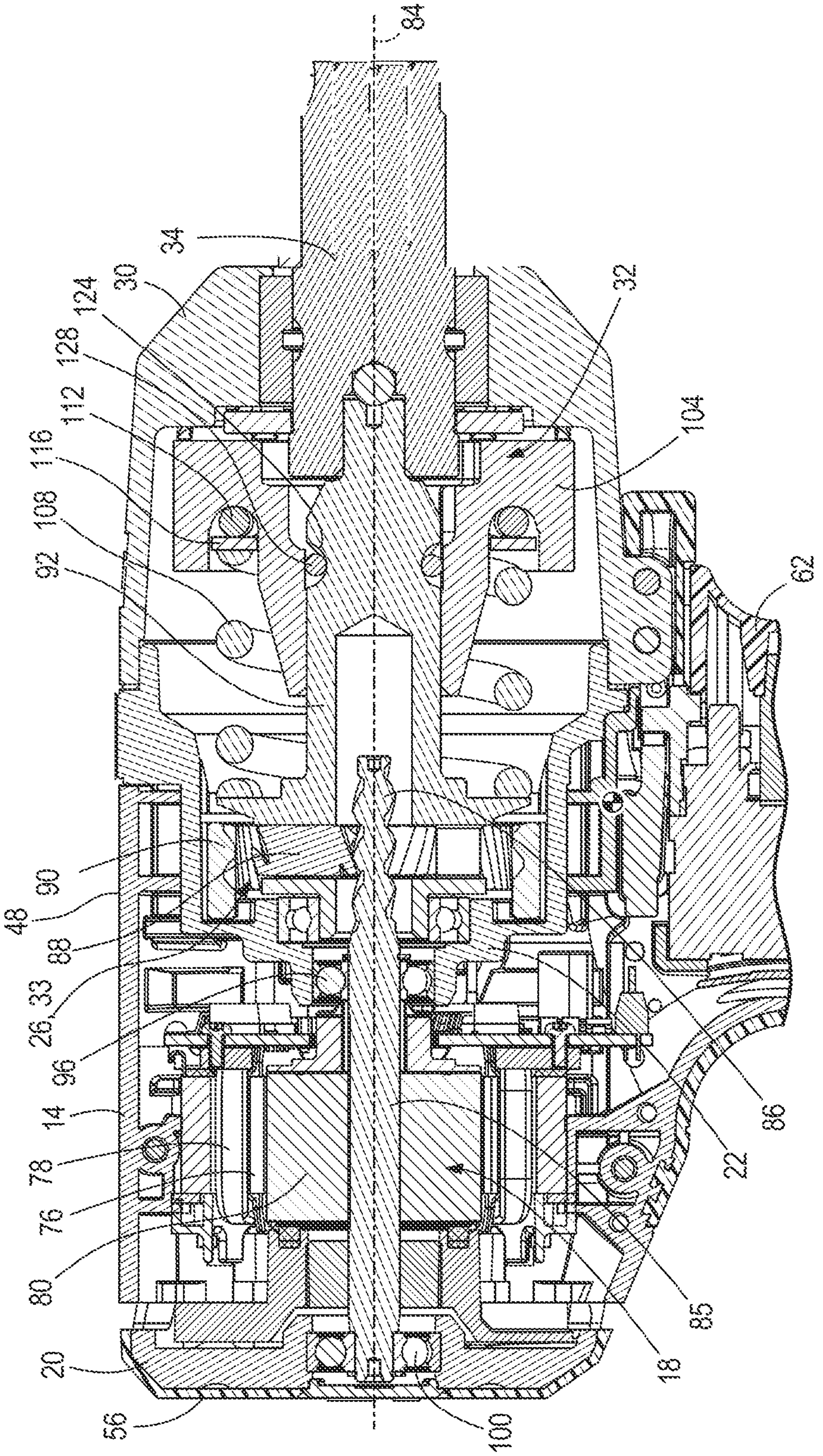
FIG. 2 is a partial cross-sectional view of the impact tool of FIG. 1.
Figure 2A:
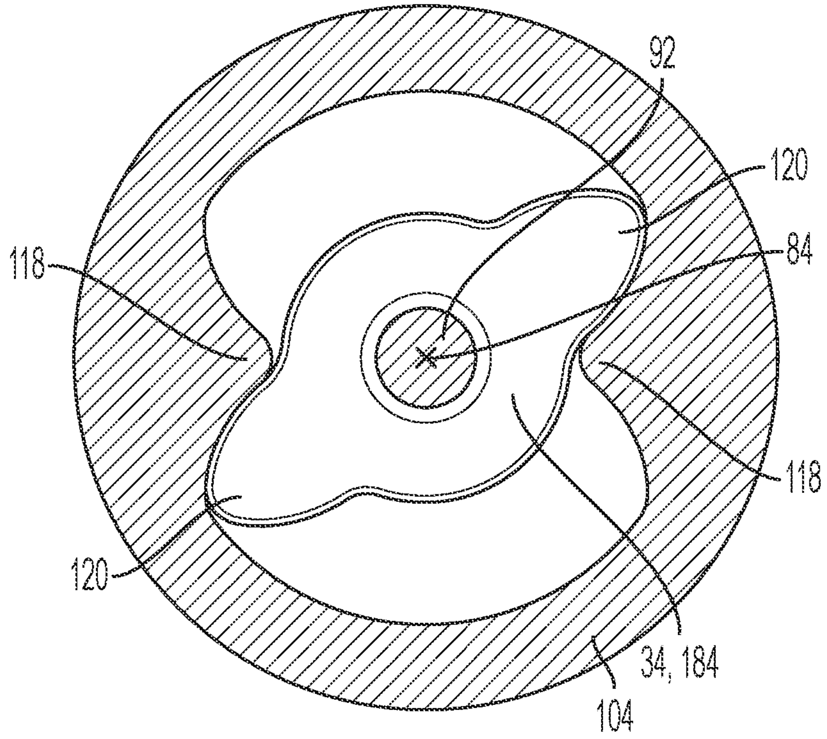
FIG. 2A is a cross-sectional view illustrating a hammer and an anvil of the impact tool of FIG. 1.

FIGS. 1-2A illustrate a power tool in the form of a rotary impact tool or impact wrench 10. The impact wrench 10 includes a motor housing 14 in which an electric motor 18 is supported (FIG. 2), an end cap 20 coupled to a rear end of the motor housing 14, a gear case 22 at least partially housing a gear train 26, and an impact housing 30 housing a rotary impact mechanism 32. The gear train 26 and impact mechanism 32 are part of a drive assembly 33 for converting a continuous torque input from the motor 18 to consecutive rotational impacts upon a workpiece, as described in further detail below.

Figure 3:
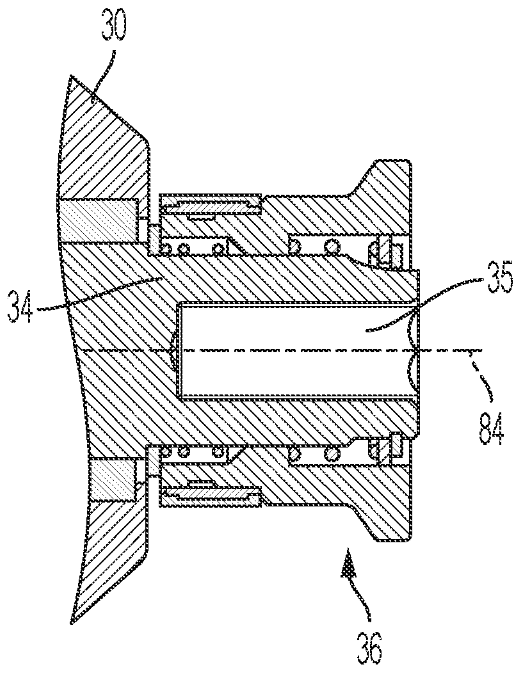
FIG. 3 is a cross-sectional view illustrating a portion of an impact tool according to another embodiment of the invention.

The impact mechanism 32 includes an anvil 34 for performing fastening or loosening operations on a workpiece, such as a fastener. In the embodiment of FIGS. 1-2A, the anvil 34 has a square drive to receive a socket. In other embodiments, such as an embodiment illustrated in FIG. 3, the distal end of the anvil 34 may include a longitudinal bore 35 in which a tool bit (e.g., a hexagonal-shank tool bit) is receivable, such that the tool bit can perform fastening or loosening operations on the workpiece in response to receiving torque from the anvil 34. The embodiment of FIG. 3 also includes a bit retention assembly 36 that facilitates retention and removal of the tool bit from the longitudinal bore 35 of the anvil 34. In some embodiments, the bit retention assembly 36 is similar or identical to the bit retention assembly described in U.S. Patent Application Publication No. 2020/0215668, filed on Jan. 9, 2020, the entire content of which is incorporated herein by reference.

As described in further detail below and shown in FIG. 2, the gear train 26 transfers torque from the motor 18 to the impact mechanism 32, which delivers rotary impacts causing the anvil 34 to rotate. The motor 18 is preferably a brushless direct current ("BLDC") motor with a stator 76 that has a plurality of stator windings 78. The motor 18 also includes a rotor 80 having a plurality of permanent magnets (not shown).

The rotor 80 is rotatable about an axis 84 and includes a motor output shaft 85 for driving the gear train 26, and the impact mechanism 32 is coupled to an output of the gear train 26. The gear train 26 may be configured in any of a number of different ways to provide a speed reduction between the output shaft 85 and an input of the impact mechanism 32. With reference to FIG. 2, the illustrated gear train 26 includes a pinion 86 (e.g., a helical pinion) formed on the motor output shaft 85, a plurality of planet gears 88 (e.g., helical planet gears) meshed with the pinion 86, and a ring gear 90 (e.g., a helical ring gear) meshed with the planet gears 88 and rotationally fixed within the gear case 22. The planet gears 88 are mounted on a camshaft 92 of the impact mechanism 32 such that the camshaft 92 functions as a planet carrier. Accordingly, rotation of the output shaft 85 rotates the planet gears 88, which then rotate along the inner circumference of the ring gear 90 and thereby rotate the camshaft 92. The output shaft 85 is rotatably supported by a first or forward bearing 96 and a second or rear bearing 100, which is in turn supported by the end cap 20 in the illustrated embodiment.

The impact mechanism 32 of the impact wrench 10 will now be described with reference to FIG. 2. The impact mechanism 32 includes the anvil 34, which extends from the impact housing 30. The impact mechanism 32 is configured to convert the continuous rotational force or torque provided by the motor 18 and gear train 26 to a striking rotational force or intermittent applications of torque to the anvil 34 when the reaction torque on the anvil 34 (e.g., due to engagement between the tool element and a fastener being worked upon) exceeds a certain threshold. In the illustrated embodiment of the impact wrench 10, the impact mechanism 32 includes the camshaft 92, a hammer 104 supported on and axially slidable relative to the camshaft 92, and the anvil 34.

The impact mechanism 32 further includes a hammer spring 108 biasing the hammer 104 toward the front of the impact wrench 10 (i.e., toward the right in FIG. 2). In other words, the hammer spring 108 biases the hammer 104 in an axial direction toward the anvil 34, along the axis 84. A thrust bearing 112 and a thrust washer 116 are positioned between the hammer spring 108 and the hammer 104. The thrust bearing 112 and the thrust washer 116 allow for the hammer spring 108 and the camshaft 92 to continue to rotate relative to the hammer 104 after each impact strike when lugs 118 (FIG. 2A) on the hammer 104 engage with corresponding anvil lugs 120 (FIG. 2A) and rotation of the hammer 104 momentarily stops.

The camshaft 92 further includes cam grooves 124 in which corresponding cam balls 128 are received (FIG. 2). The cam balls 128 are in driving engagement with the hammer 104 such that movement of the cam balls 128 within the cam grooves 124 allows for relative axial movement of the hammer 104 along the camshaft 92 when the hammer lugs 118 and the anvil lugs 120 are engaged, rotation of the anvil 34 is seized, and the camshaft 92 continues to rotate.

In operation of the impact wrench 10, the operator depresses a trigger 62 to activate the motor 18, which continuously drives the gear train 26 and the camshaft 92 via the output shaft 85. As the camshaft 92 rotates, the cam balls 128 drive the hammer 104 to co-rotate in a working rotational direction with the camshaft 92 about the axis 84, and the hammer lugs 118 engage, respectively, driven surfaces of the anvil lugs 120 to provide an impact and to rotatably drive the anvil 34 in the working rotational direction. After each impact, the hammer 104 moves or slides rearward along the camshaft 92, away from the anvil 34, so that the hammer lugs 118 disengage the anvil lugs 120. The hammer spring 108 stores some of the rearward energy of the hammer 104 to provide a return mechanism for the hammer 104. After the hammer lugs 118 disengage the respective anvil lugs 120, the hammer 104 continues to rotate in the working rotational direction and moves or slides forwardly, toward the anvil 34, as the hammer spring 108 releases its stored energy, until the drive surfaces of the hammer lugs 118 re-engage the driven surfaces of the anvil lugs 120 to cause another impact.

Figure 4:
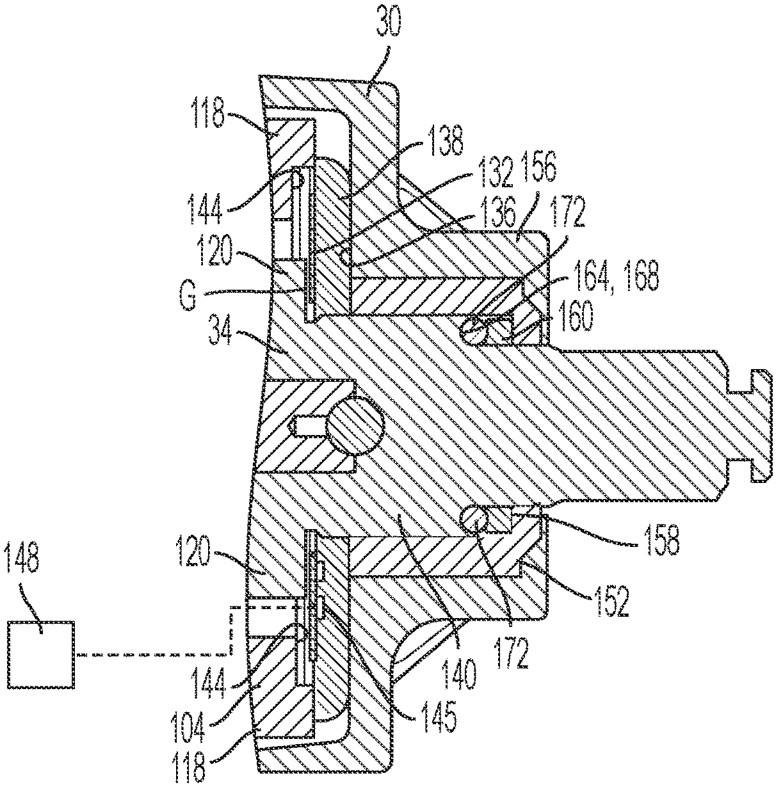
FIG. 4 is a cross-sectional view illustrating a portion of an impact tool according to another embodiment of the invention.

In an embodiment shown in FIG. 4, which may be incorporated into the impact wrench 10, an annular anvil printed circuit board assembly (PCBA) 132 is arranged on a front interior face 136 of the impact housing 30 via, e.g. a carrier 138. The anvil PCBA 132 encircles a body 140 of anvil 34. The anvil PCBA 132 is spaced from the anvil lugs 120, such that there is a gap G therebetween. The hammer 104 includes axial recesses 144 on its front side, formed in the hammer lugs 118, such that the anvil PCBA 132 also avoids contact with the hammer lugs 118. The anvil PCBA 132 includes at least one anvil rotation sensor 145 (e.g., a Hall-effect sensor or inductive sensor, shown schematically in FIG. 4) configured to detect a rotational position and/or a number of rotations of the anvil 34 during operation (e.g. via detection of a target such as a magnet or the metallic body of the anvil 34). The anvil rotation sensor 145 can detect each rotation of the anvil 34, or, in some embodiments, each fractional rotation of the anvil 34 (e.g., each half rotation of the anvil 34). The anvil rotation sensor 145 is in electrical communication with a controller 148 (e.g., a programmable controller including a microprocessor, memory, and a suitable input/output interface for communicating with the anvil rotation sensor 145; shown schematically in FIG. 4). Based on feedback from anvil rotation sensor 145, the controller 148 can determine the impact frequency (e.g., impacts per minute) delivered by the anvil 34 to the fastener or workpiece.

With continued reference to FIG. 4, a bushing 152 is arranged in a front annular extension 156 of the impact housing 30, and a thrust bearing 158 is arranged between the bushing 152 and the body 140 of the anvil 34. The thrust bearing 158 includes a first race 160 that is arranged within and coupled to the bushing 152. In other embodiments, the first race 160 can be formed as an integral part of the bushing 152. The thrust bearing 158 also includes a second race 164 that is formed as an integral part of a front face 168 of the body 140 of the anvil 34, and a plurality of rolling elements (e.g., balls) 172 arranged between the first and second races 160, 164. In some embodiments, the first race 160 of the thrust bearing 158 is formed of a bearing material (e.g. SAE 52100 chrome steel) and the bushing 152 is formed of a different material (e.g., a less expensive material such as carbon steel).

In operation, the anvil 34 is axially biased forward by the spring 108 (via the hammer 104; FIG. 2), but the anvil lugs 120 do not rotate against or otherwise contact the anvil PCBA 132 (FIG. 4) because the anvil lugs 120 are spaced by the gap G from the anvil PCBA 132. The thrust bearing 158 is configured to absorb the thrust load exerted on the anvil 34 during operation of the impact wrench 10. In a neutral state, the spring 108 does not bias the anvil 34 toward the rolling elements 172. However, while the impact mechanism 32 is causing the hammer 104 to impact the anvil 34, the anvil 34 could be biased against the rolling elements 172 if: (1) the hammer 104 strikes the top of the anvil lugs 120; (2) the hammer 104 strikes the edge of the anvil lugs 120 where the edge of the anvil lugs 120 have been worn to a chamfered surface such that the rotational motion of the hammer 104 produces both a torque and an axial component of force; or (3) the mass of the camshaft 92 and hammer 104 weigh down on the anvil 34 because the impact wrench 10 is pointed in a downward direction.

Figure 5:
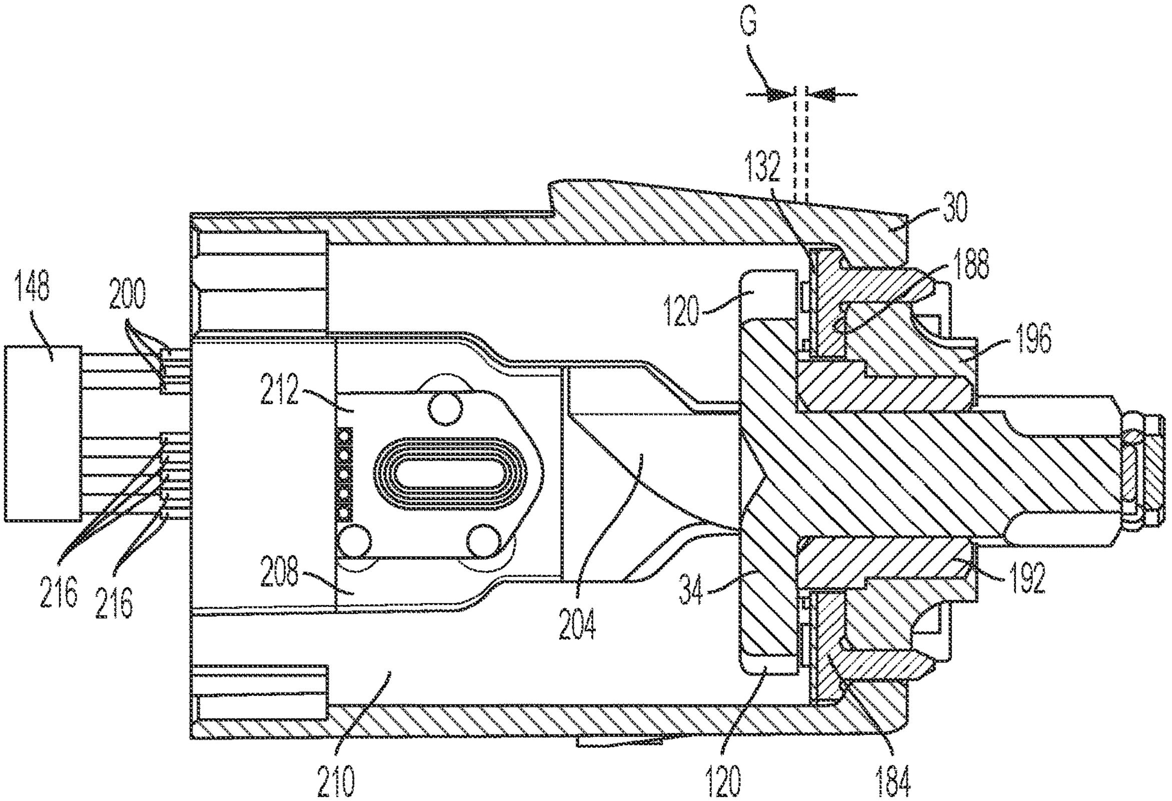
FIG. 5 is a cross-sectional view illustrating a portion of an impact tool according to another embodiment of the invention.

In an embodiment shown in FIG. 5, which may be incorporated into the impact wrench 10, the anvil PCBA 132 is coupled to a carrier 184, which is in turn coupled to a front interior face 188 of the impact housing 30. In some embodiments, the anvil PCBA 132 is heat-staked to the carrier 184 and the carrier 184 is heat-staked to the impact housing 30 (i.e. through holes in the front interior face 188 of the impact housing 30. In other embodiments, the carrier 184 may be coupled to the front interior face 188 via a press fit, snap ring, or snap fit. A bushing 192 is arranged in a front annular extension 196 of the impact housing 30 and extends rearward past the anvil PCBA 132 and is engaged by the anvil lugs 120, thereby maintaining the gap G between the anvil lugs 120 and the anvil PCBA 132. In some embodiments, the carrier 184 is coupled to the bushing 192 rather than directly to the impact housing 30, such that the bushing 192 supports the carrier 184. The carrier 184 and anvil PCBA 132 encircle the bushing 192. A set of wires 200 extends from the anvil PCBA 132 to the controller 148 via a transition cover 204 and a second carrier 208, both of which are set on an interior wall 210 (e.g., an interior side wall) of the impact housing 30. In other embodiments, the second carrier 208 is omitted, and the wires 200 are routed through a hole on the bottom, side, or front of the impact housing 30 to the controller 148.

With continued reference to FIG. 5, the second carrier 208 also carries a hammer PCBA 212 for detecting a rotational position and/or a number of rotations of the hammer 104 during operation. The hammer PCBA 212 is also in electrical communication with the controller 148 via a second set of wires 216 extending from the second carrier 208. In operation of the embodiment of FIG. 5, the anvil 34 is axially biased forward, but the anvil lugs 120 do not rotate against or otherwise contact the anvil PCBA 132 because the anvil lugs 120 are spaced by the gap G from the anvil PCBA 132. The bushing 192 is configured to absorb the thrust load exerted on the anvil 34 during operation of the impact wrench 10. In other embodiments, a thrust washer is arranged between the anvil 34 and the bushing 192, such that the thrust washer is configured to absorb the thrust load exerted on the anvil 34 during operation of the impact wrench 10, and the anvil 34 does not contact the bushing 192.

Figure 6:
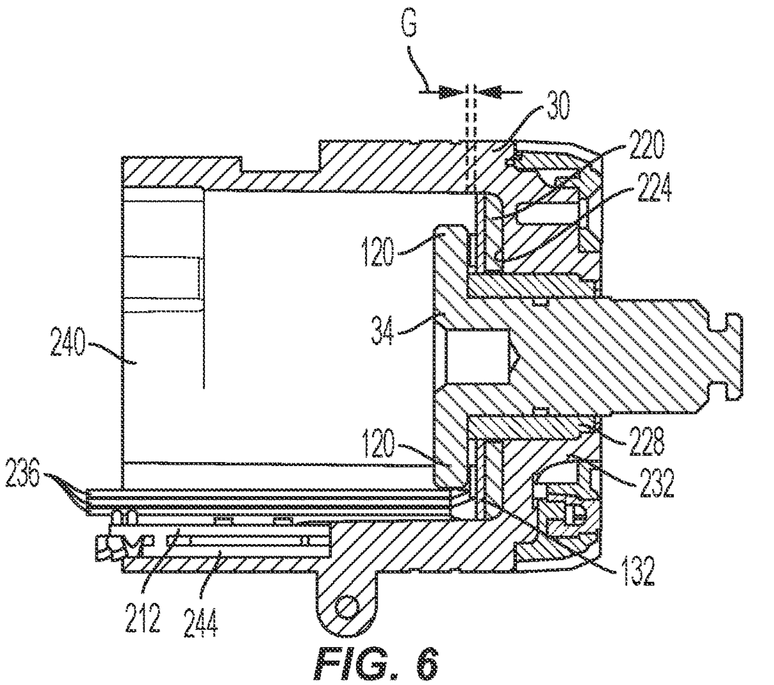
FIG. 6 is a cross-sectional view illustrating a portion of an impact tool according to another embodiment of the invention.

In an embodiment shown in FIG. 6, which may be incorporated into the impact wrench 10, the anvil PCBA 132 is coupled to a carrier 220, which is in turn coupled to a front interior face 224 of the impact housing 30. In some embodiments, the anvil PCBA 132 is heat-staked to the carrier 220 and the carrier 220 is heat-staked to the impact housing 30. A bushing 228 is arranged in a front annular extension 232 of the impact housing 30 and extends rearward past the anvil PCBA 132 and is engaged by the anvil lugs 120, thereby creating the gap G between the anvil lugs 120 and the anvil PCBA 132. The carrier 220 and anvil PCBA 132 encircle the bushing 228. A set of wires 236 extends from the anvil PCBA 132 along an interior wall 240 of the impact housing 30 (e.g., to the controller 148; FIGS. 4-5).

With continued reference to FIG. 6, a second carrier 244 is set on the interior wall 240 of the impact housing 30 and carries the hammer PCBA 212 for detecting a rotational position and/or a number of rotations of the hammer 104 during operation. In operation of the embodiment of FIG. 6, the anvil 34 is axially biased forward, but the anvil lugs 120 do not rotate against or otherwise contact the anvil PCBA 132 because the anvil lugs 120 are spaced by the gap G from the anvil PCBA 132. The bushing 228 is configured to absorb the thrust load exerted on the anvil 34 during operation of the impact wrench 10.

Figure 7:
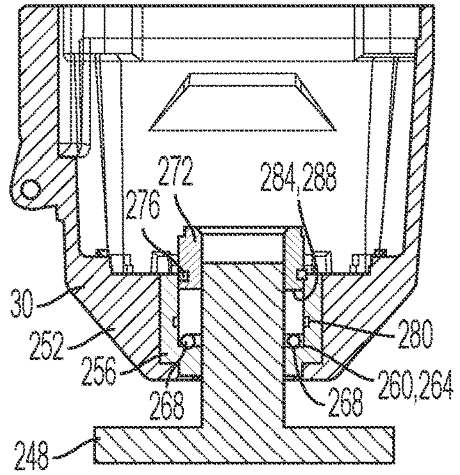
FIG. 7 is a partial cross-sectional view of an impact tool during a first assembly step, according to another embodiment of the invention.
Figure 8:
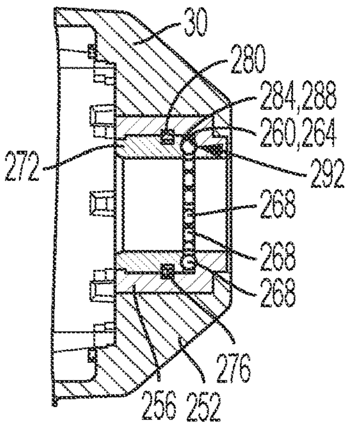
FIG. 8 is a partial cross-sectional view of the impact tool of FIG. 7, after a subsequent assembly step.
Figure 9:
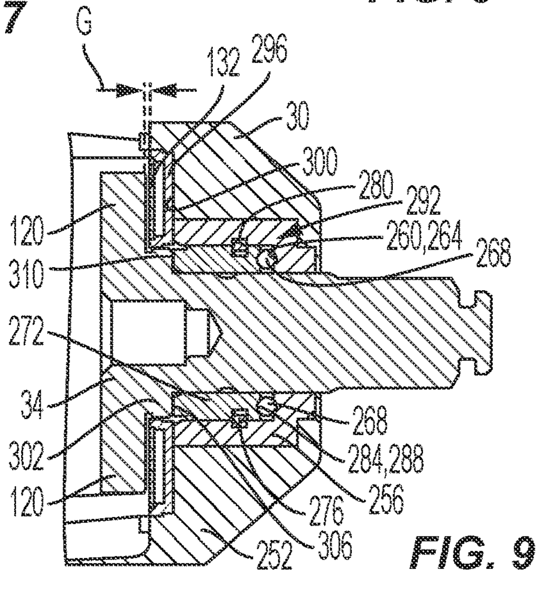
FIG. 9 is a partial cross-sectional view of the impact tool of FIG. 7, after a subsequent assembly step.

FIGS. 7-9 illustrate another embodiment of the impact housing 30 and a thrust bearing 292, which may be incorporated into the impact wrench 10, and a method of assembling the same. Initially, as shown in FIG. 7, the impact housing 30 is supported on a fixture 248 that extends through a front portion 252 of the impact housing 30, as well as a first bushing part 256 arranged in the front portion 252. The first bushing part 256 includes an interior front face 260 that helps form a first race 264 on which a plurality of rolling elements 268 is arranged.

In a first assembly step, a second bushing part 272 is slip fit within the first bushing part 256 until a C-ring 276 on the second bushing part 272 is axially aligned with an interior circumferential groove 280 on the first bushing part 256. While the second bushing part 272 is being inserted into the first bushing part 256, the C-ring 276 compresses until it aligns with the circumferential groove 280 on the first bushing part 256, at which point the C-ring 276 expands, thereby axially locking the second bushing part 272 with respect to the first bushing part 256, but allowing rotation of the second bushing part 272 relative to the first bushing part 256. The second busing part 272 includes a front face 284 that forms part of a second race 288, such that the rolling elements 268 are arranged between the first and second races 264, 288 to collectively form a thrust bearing 292. Thus, even before the anvil 34 has been added to the assembly, the rolling elements 268 are advantageously retained by the thrust bearing 292, as shown in FIG. 8.

Subsequently, as shown in FIG. 9, a carrier 296 is coupled to a front interior face 300 of the impact housing 30. The carrier 296 supports the anvil PCBA 132, which is separated by the gap G from the anvil lugs 120. An extension 302 of the anvil 34, which extends in a forward axial direction from the anvil lugs 120 and wraps circumferentially about the anvil 34, includes a front face 306 that abuts against a rear face 310 of the second bushing part 272.

In operation of the embodiment of FIGS. 7-9, the anvil 34 is axially biased forward, but the anvil lugs 120 do not rotate against or otherwise contact the anvil PCBA 132 because the anvil lugs 120 are spaced by the gap G from the anvil PCBA 132. Also, the second bushing part 272 and thrust bearing 292 facilitate rotation of the anvil 34, due to the abutting relationship of the front and rear faces 306, 310, allowing the second bushing part 272 to rotate with the anvil 34 and relative to the first bushing part 256, as the anvil lugs 120 are repeatedly impacted by the hammer lugs 118.

Figure 10:
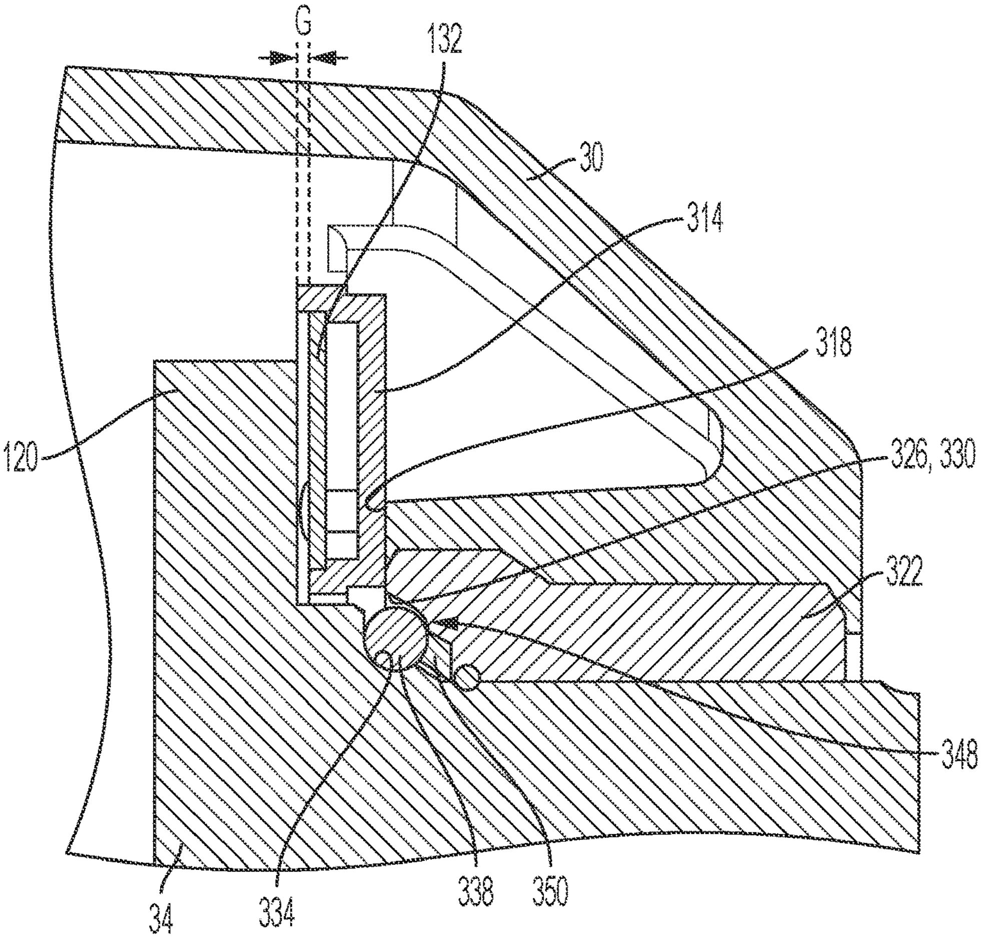
FIG. 10 is a cross-sectional view illustrating a portion of an impact tool according to another embodiment of the invention.

In an embodiment shown in FIG. 10, which may be incorporated into the impact wrench 10, the anvil PCBA 132 is coupled to a carrier 314, which is in turn coupled to a front interior face 318 of the impact housing 30, with the gap G defined between the anvil PCBA 132 and the anvil lugs 120. A bushing 322 is arranged within the impact housing 30 and includes a first (outer) race 326 formed as part of a rear face 330 of the bushing 322. The anvil 34 includes a second (inner) race 334, defined by a curved surface of the anvil in front of the anvil lugs 120, and a plurality of rolling elements 338 is arranged between the first and second races 326, 344, such that a thrust bearing 348 is thereby formed. A retainer 350 (e.g., a c-clip) is set between the bushing 322 and anvil 34 to ensure the rolling elements 338 remain positioned between the first and second races 326, 344.

In operation of the embodiment of FIG. 10, the anvil 34 is axially biased forward, but the anvil lugs 120 do not rotate against or otherwise contact the anvil PCBA 132 because the anvil lugs 120 are spaced by the gap G from the anvil PCBA 132. Also, the thrust bearing 348 facilitates rotation of the anvil 34 by allowing the anvil 34 to rotate relative to the bushing 322 as the anvil lugs 120 are repeatedly impacted by the hammer lugs 118.

Figure 11:
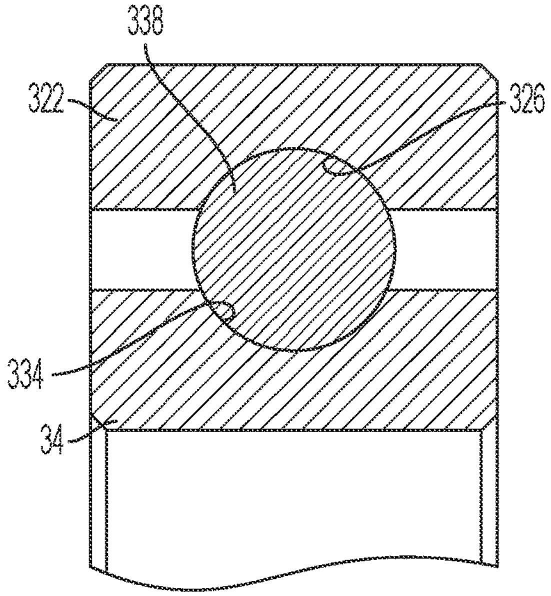
FIG. 11 is a cross-sectional view illustrating a portion of an impact tool according to another embodiment of the invention.
Figure 12:
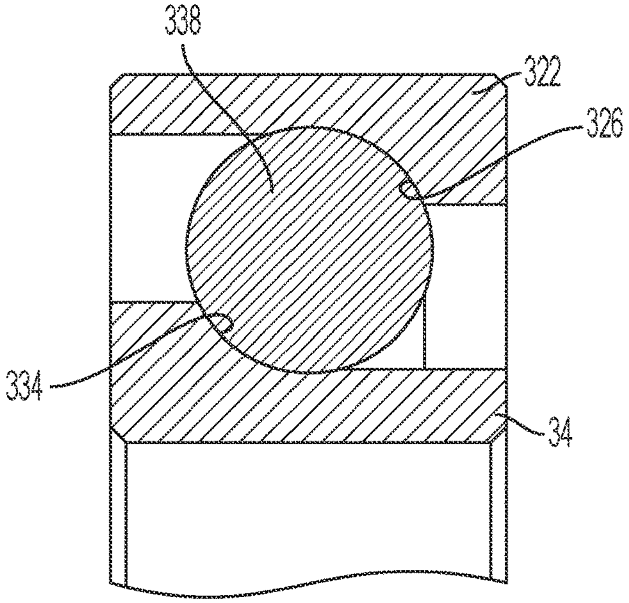
FIG. 12 is a cross-sectional view illustrating a portion of an impact tool according to another embodiment of the invention.

FIG. 11 illustrates a modification of the embodiment of FIG. 10, showing a deep-groove thrust bearing arrangement without the retainer 350. In the embodiment of FIG. 11, the inner race 334 and outer race 326 are symmetrical and positioned opposite one another in an axial direction of the anvil 34. FIG. 12 illustrates a modification of the embodiment of FIG. 11, showing an angular contact bearing arrangement without the retainer 350. In the embodiment of FIG. 12, the inner race 334 and outer race 326 are offset from one another in a radial direction of the anvil 34.

Figure 13:
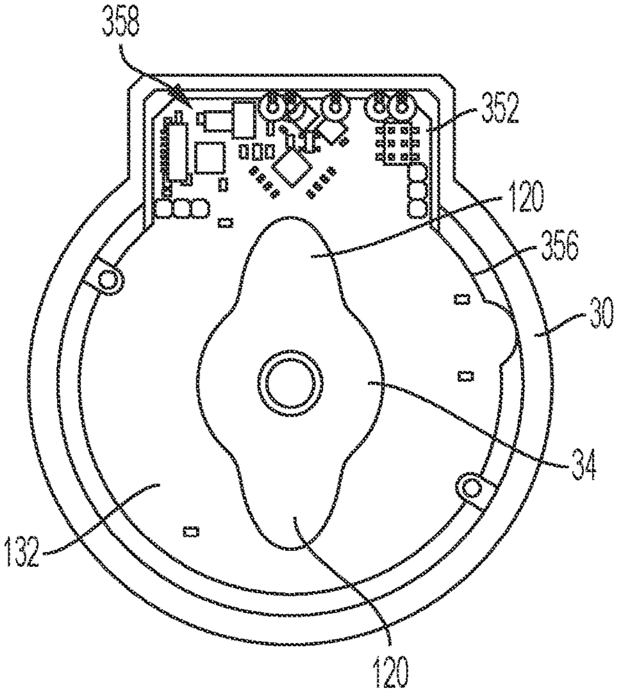
FIG. 13 is an end view illustrating a portion of an impact tool according to another embodiment of the invention.
Figure 14:
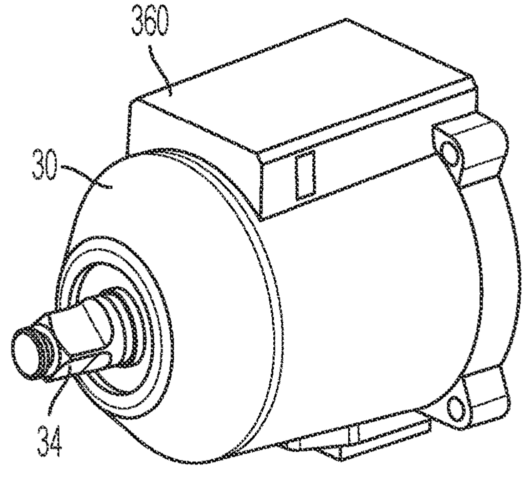
FIG. 14 is a perspective view of an impact housing of the impact tool of FIG. 13.
Figure 15:
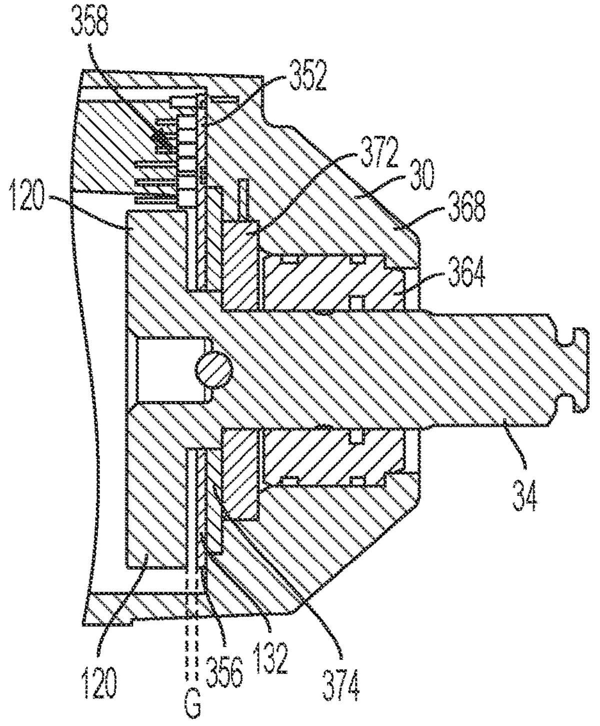
FIG. 15 is a cross-sectional view of a portion of the impact tool of FIG. 13.

In an embodiment shown in FIGS. 13-15, which may be incorporated into the impact wrench 10, the anvil PCBA 132 includes a tab or extension 352 that extends from an outer diameter 356 of the annular portion of the anvil PCBA 132, as shown in FIG. 13. Electronic components 358 are arranged on the extension 352. To accommodate the extension 352 of the anvil PCBA 132, the impact housing 30 may include a rectilinear housing extension 360 (FIG. 14) that receives the extension 352 on the anvil PCBA 132. A bushing 364 is arranged within a front portion 368 of the impact housing 30 and a washer 372 is arranged between the bushing 364 and the anvil 34, in abutting relationship with an axial extension of the anvil 34, thereby creating the gap G.

In operation of the embodiment of FIGS. 13-15, the anvil 34 is axially biased forward, but the anvil lugs 120 do not rotate against or otherwise contact the anvil PCBA 132 because the anvil lugs 120 are spaced by the gap G from the anvil PCBA 132. The electronic components 358 on the extension 352 are outside the path of the rotating anvil lugs 120, and are also not contacted by the anvil lugs 120. An annular piece of ferrite 374 or other ferromagnetic material may be arranged between the washer 372 and anvil PCBA 132 to improve the signal from the sensor 145 by concentrating the magnetic field.

Figure 16:
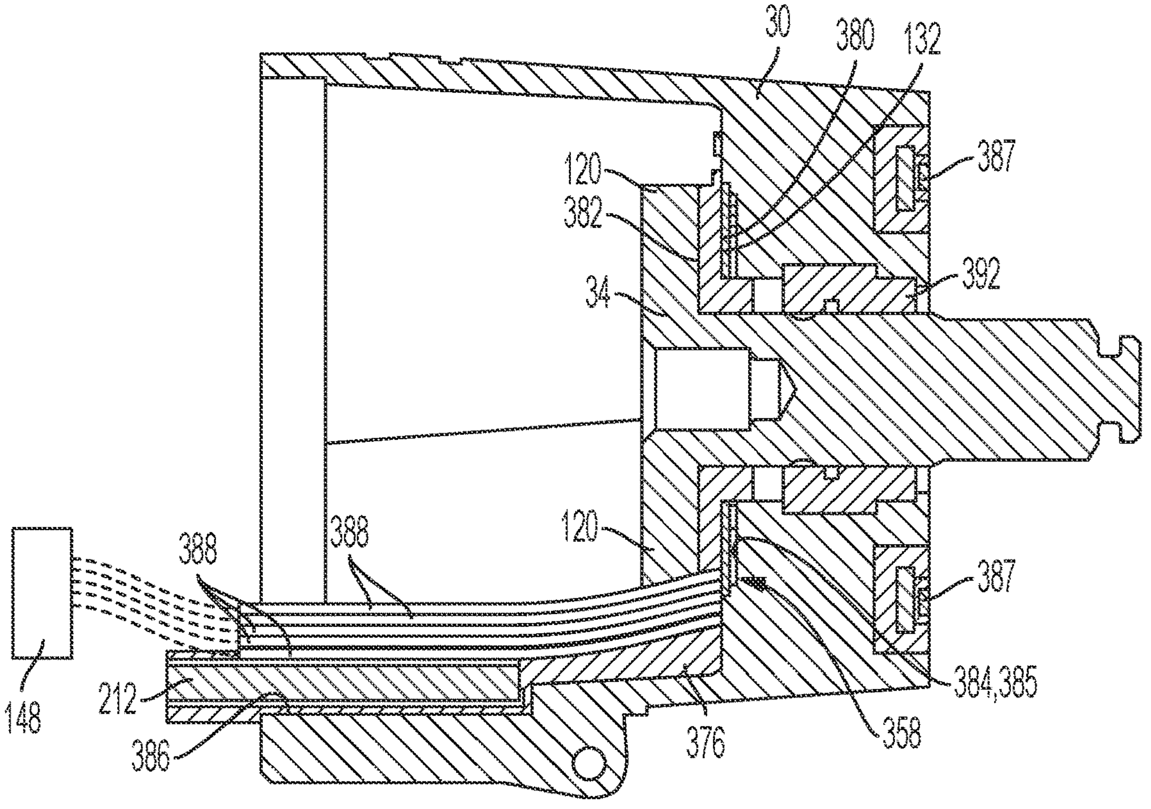
FIG. 16 is a cross-sectional view illustrating a portion of an impact tool according to another embodiment of the invention.

In an embodiment shown in FIGS. 16-19, which may be incorporated into the impact wrench 10, a single carrier 376 is arranged within the impact housing 30 to support both the anvil PCBA 132 and the hammer PCBA 212. In some embodiments, the carrier 376 is formed of a plastic material or other material with low magnetic susceptibility, such that the magnetic circuit created by the interaction between the anvil lugs 120 and the sensor 145 (e.g. inductance) on the anvil PCBA 132 is not affected by the carrier 376. As shown in FIG. 16, the anvil PCBA 132 is arranged on a vertical front face 380 of the carrier 376, and the anvil lugs 120 engage against a vertical rear face 382 of the carrier 376 that is opposite the vertical front face 380. The electronic components 358 on the anvil PCBA 132 are spaced from the impact housing 30 via a recess 384 formed in a front interior face 385 of the impact housing 30.

Figure 17:
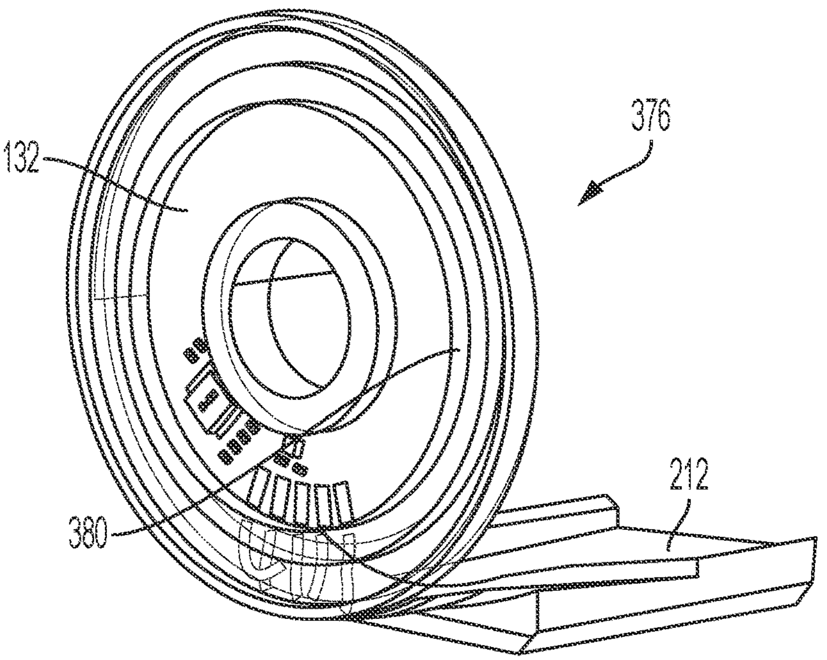
FIG. 17 is a perspective view of a carrier of the impact tool of FIG. 16.
Figure 18:
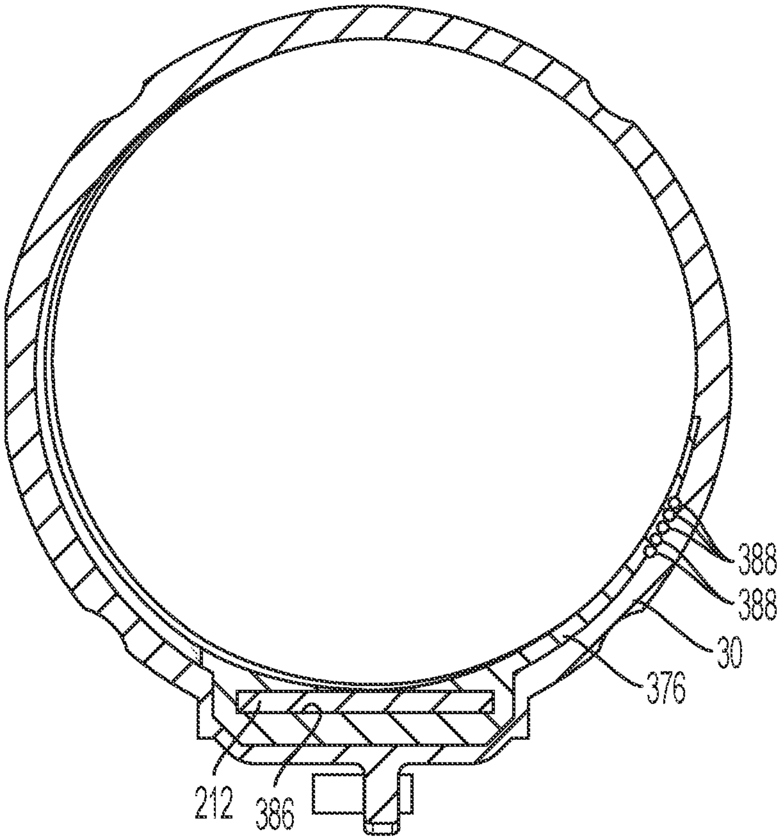
FIG. 18 is a cross-sectional view of the impact tool of FIG. 16, with portions removed.
Figure 19:
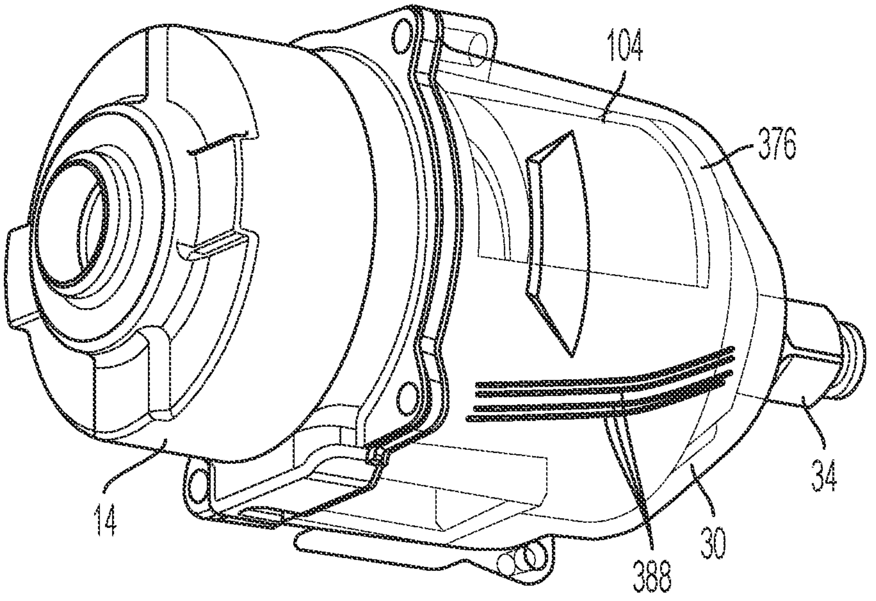
FIG. 19 is a perspective view of an impact housing of the impact tool of FIG. 16, with portions removed

With reference to FIGS. 16-18, the hammer PCBA 212 is arranged on a bottom horizontal face 386 of the carrier 376, such that the hammer PCBA 212 is perpendicular to the anvil PCBA 132. In the illustrated embodiment, a plurality of LEDs 387 is arranged in the impact housing 30 to illuminate the bit or workpiece from multiple different angles so as to not form shadows. A set of wires 388 electrically connecting the anvil PCBA 132 and the LEDs 387 to the controller 148 extends between the carrier 376 and the impact housing 30, as shown in FIGS. 18 and 19.

In operation of the embodiment of FIGS. 16-19, the anvil 34 is axially biased forward, but because the anvil PCBA 132 is arranged on a front face of the carrier 376, the anvil lugs 120 do not rotate against or otherwise contact the anvil PCBA 132. Instead, the anvil lugs 120 rotate against the rear face 382 of the carrier 376. Also, a bushing 392 (FIG. 16) is configured to absorb the thrust load exerted on the anvil 34 during operation of the impact wrench 10.

Figure 20:
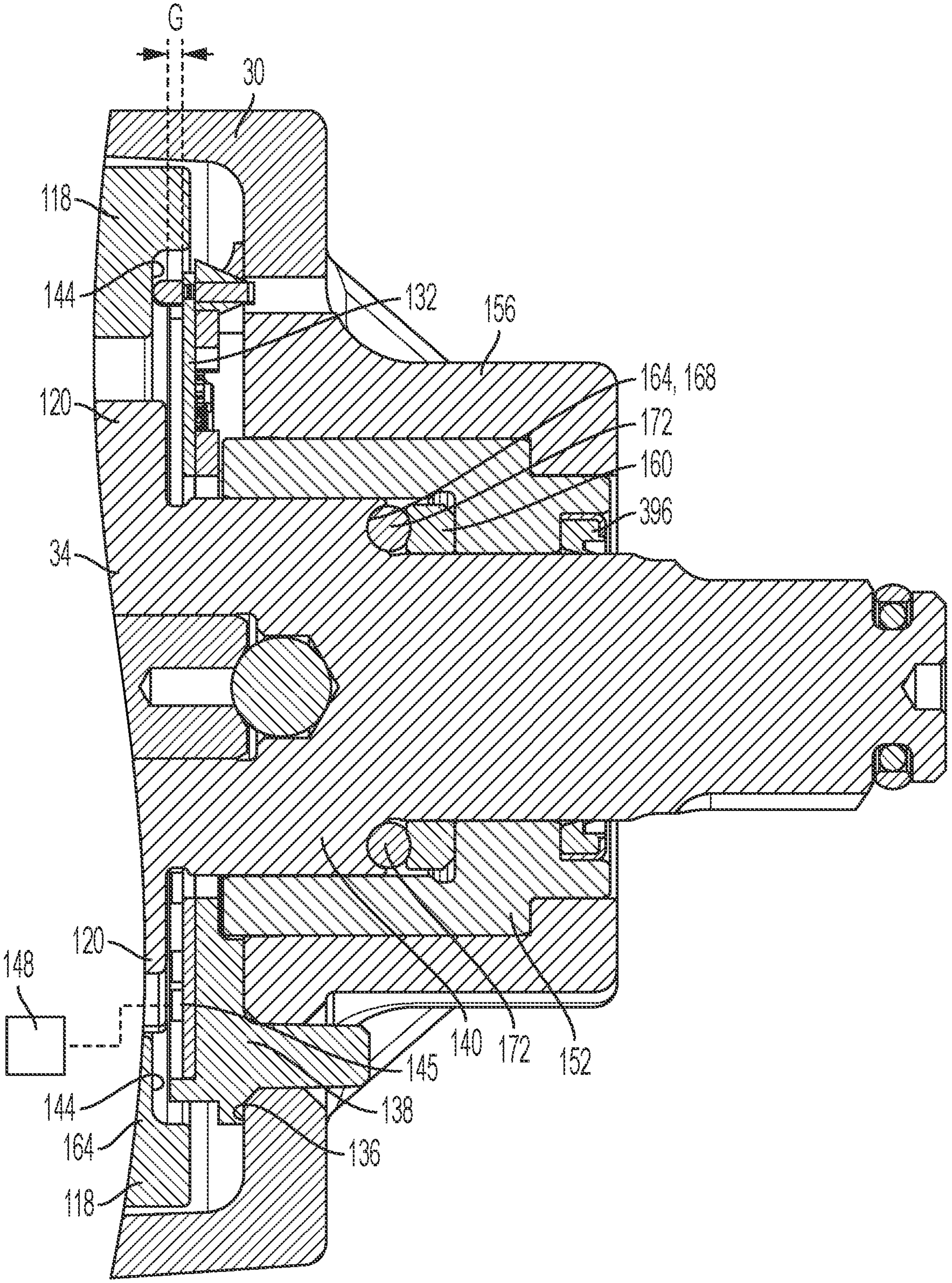
FIG. 20 is a cross-sectional view illustrating a portion of an impact tool according to another embodiment of the invention.

FIG. 20 illustrates an embodiment similar to the embodiment of FIG. 4, with like components and features being assigned like reference numerals, and the following differences explained below. In the embodiment of FIG. 20, the bushing 152 includes a radial lip seal 396 arranged on the anvil 34 to prevent ingress of debris or the escape of lubricant.

Figure 21:
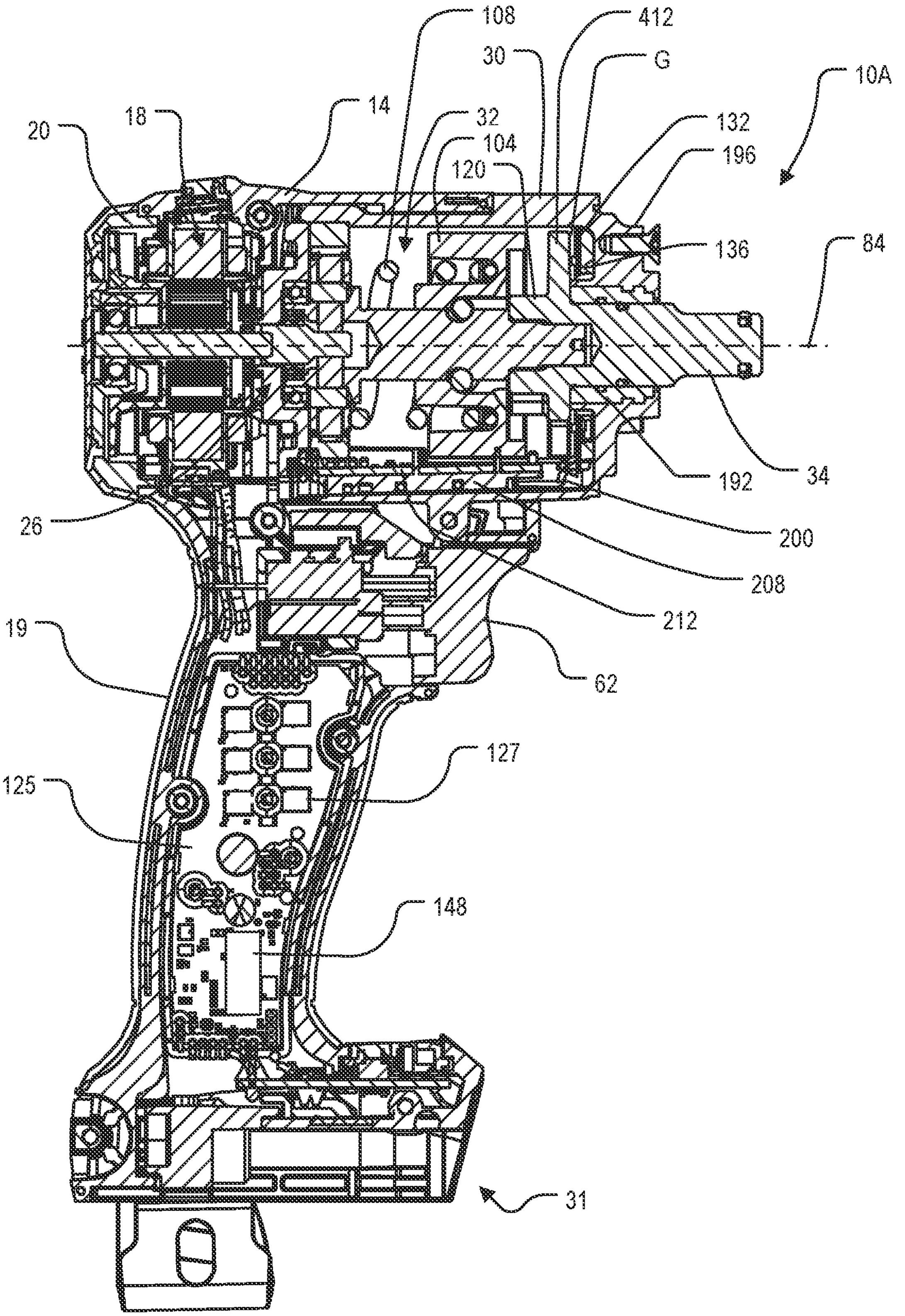
FIG. 21 is a cross-sectional view of an impact tool according to another embodiment of the invention.

FIG. 21 illustrates an impact wrench 10A according to another embodiment. The impact wrench 10A is similar to the impact wrench 10 described above, with like components and features being assigned like reference numerals. Components and features of the impact wrench 10, including alternative embodiments described herein, may be incorporated into the impact wrench 10A and vice versa. In addition, the following description focuses on differences between the impact wrench 10A and the impact wrench 10.

The impact wrench 10A includes a motor housing 14 in which an electric motor 18 is supported (FIG. 2), a handle portion 19 extending from the motor housing 14 and configured to be grasped by a user during operation of the impact wrench 10A, an end cap 20 coupled to a rear end of the motor housing 14, and an impact housing 30 coupled to and extending from a front end of the motor housing 14. The illustrated motor housing 14 and handle portion 19 are defined by cooperating clamshell halves fastened together by a plurality of fasteners.

The handle portion 19 includes a battery receptacle 31 at a lower end thereof, opposite the motor housing 14. The battery receptacle 31 is configured to receive a battery (not shown), such as a rechargeable power tool battery pack, to provide power to the motor 18. The battery may be a lithium-ion battery having a nominal output voltage of 18-Volts. In other embodiments, other types of batteries or other power sources may be used to power the motor 18. The handle portion 19 also supports the trigger 62 for operating the impact wrench 10A.

A main PCBA 125 is supported within the handle portion 19 of the impact wrench 10A. The main PCBA 125 may include, among other things, switching electronics 127, such as MOSFETs, IGBTs, or the like, for providing power from the battery to the motor 18 and controlling operation of the motor 18. The main PCBA 125 may also support one or more controllers, such as the controller 148 described above with reference to FIGS. 4, 5, and 16.

The impact wrench 10A further includes an anvil PCBA 132 supported by a first carrier 138 coupled to a front interior face 136 of the impact housing 30, and a hammer PCBA 212 supported by a second carrier 208 coupled to a lower interior face of the impact housing 30. In the illustrated embodiment, the hammer PCBA 212 extends parallel to the axis 84, and the anvil PCBA 132 extends perpendicular to the axis 84 and to the hammer PCBA 212. This arrangement of the hammer PCBA 212 and anvil PCBA 132 advantageously minimizes the space required to accommodate the PCBAs 212, 132 and also places the PCBAs 212, 132 in optimal positions for sensing the hammer 104 and anvil 34, respectively.

Figure 22:
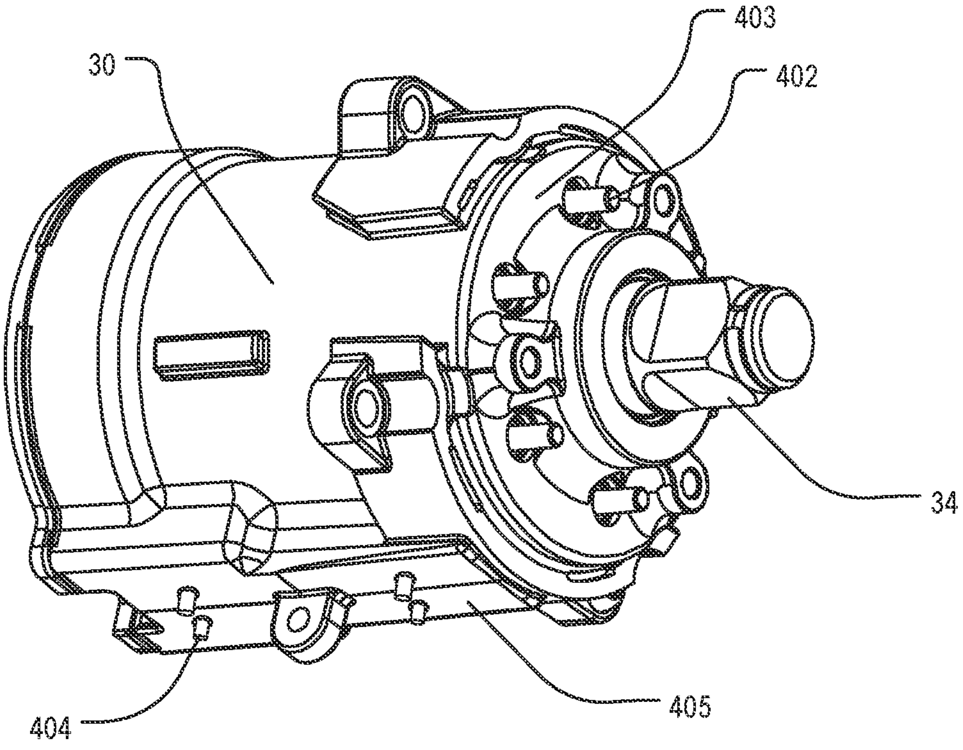
FIG. 22 is a perspective view illustrating an impact housing of the impact tool of FIG. 21.

Referring to FIG. 22 in the illustrated embodiment, the first carrier 138 includes a plurality of forwardly-extending stakes 402 extending through a front side 403 of the impact housing 30, and the second carrier 208 includes a plurality of downwardly-extending stakes 404 extending through a lower side 405 of the impact housing 30. The stakes 402, 404 are heated and at least partially melted during assembly to couple the carriers 138, 208 to the impact housing 30. Heat staking requires only localized heating of the stakes 402, 404 and does not require vibration like ultrasonic plastic welding processes. This allows the carriers 138, 208 to be coupled to the impact housing 30 with the anvil PCBA 132 and the hammer PCBA 212 already in place within the respective carriers 138, 208, thereby facilitating assembly. In other embodiments, however, the carriers 138, 208 may be coupled to the impact housing 30 in other ways.

Figure 23:
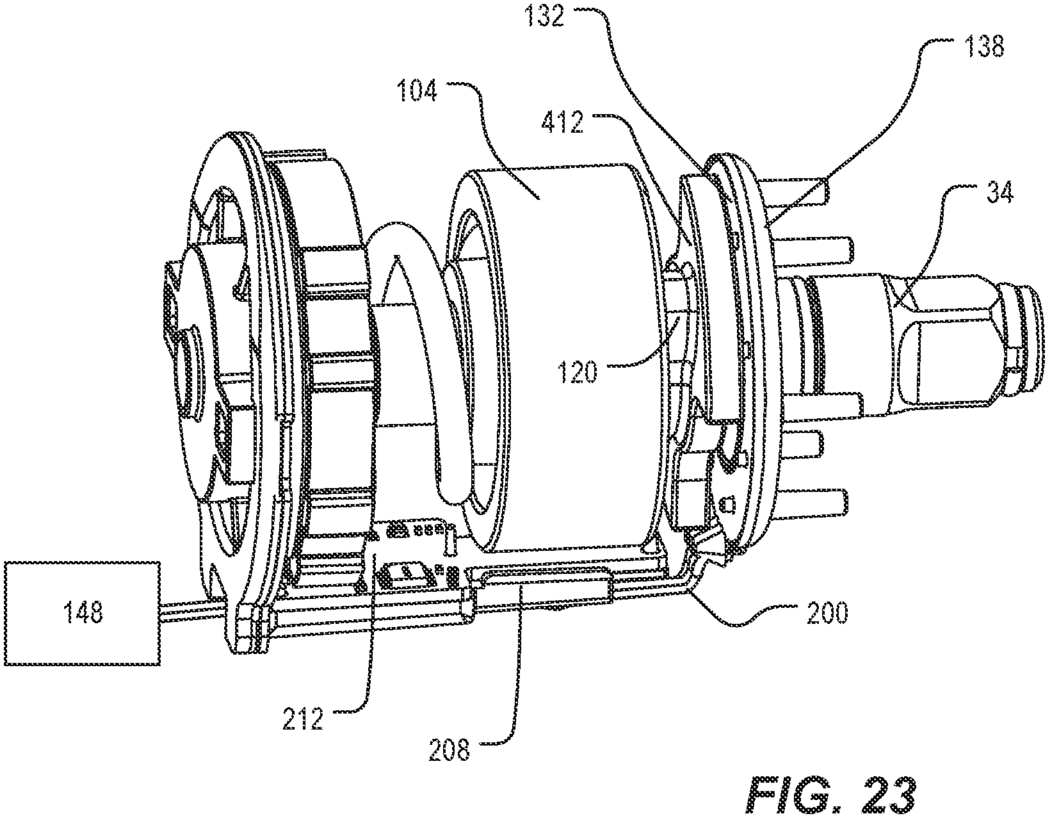
FIG. 23 is a perspective view illustrating portions of the impact tool of FIG. 21.
Figure 24:
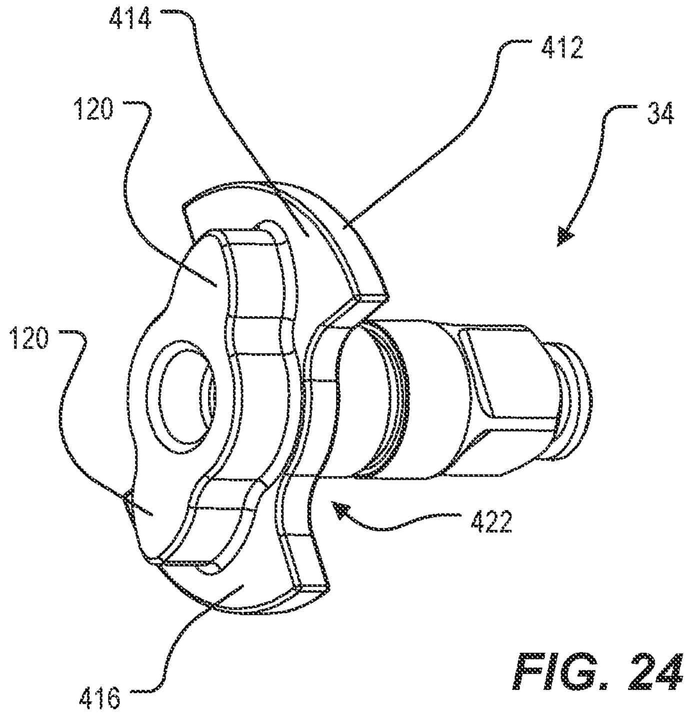
FIG. 24 is a perspective view of an anvil of the impact tool of FIG. 21.
Figure 25:
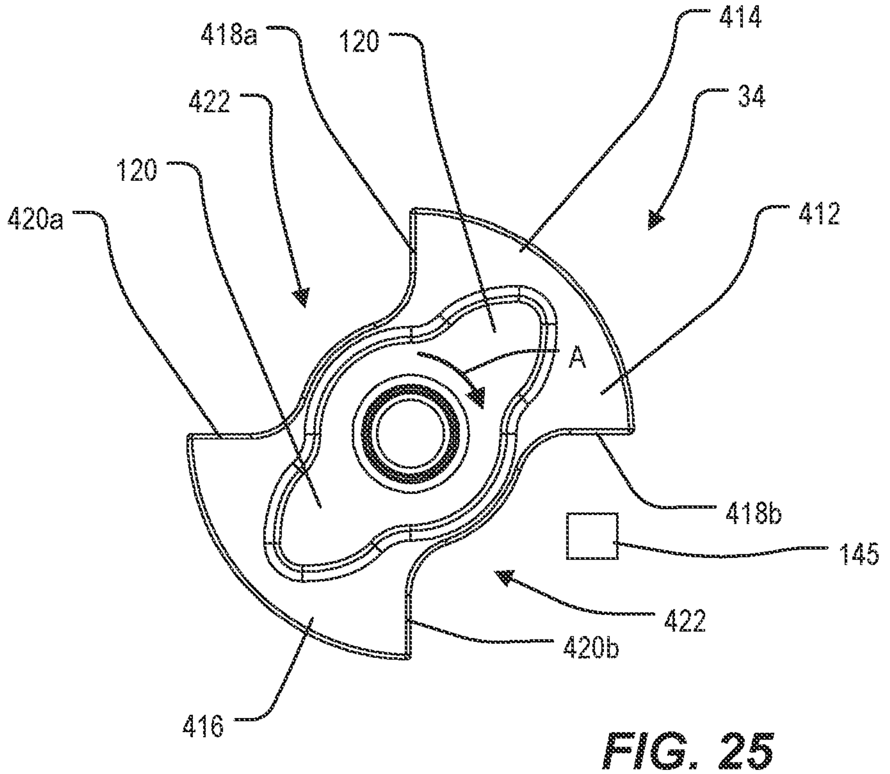
FIG. 25 is a rear view of the anvil of FIG. 24.

The anvil PCBA 132 includes at least one anvil rotation sensor (e.g., a Hall-effect sensor or inductive sensor, such as the sensor 145 shown schematically in FIG. 4) configured to detect a rotational position and/or a number of rotations of the anvil 34 during operation (e.g. via detection of a target such as a magnet or the metallic body of the anvil 34). Referring to FIGS. 23-25, the illustrated anvil 34 includes a target 412 positioned in front of the anvil lugs 120. That is, the target 412 is disposed between the anvil lugs 120 and the sensor(s) 145 on the anvil PCBA 132.

In each of the embodiments described and shown herein, the anvil lugs 120 and the target 412 do not engage the anvil PCBA 132. Also, the anvil PCBA 132 maintains as small an inner bore diameter (through which the anvil 34 extends) as possible, thus enabling the anvil PCBA 132 to have as large a surface area as possible, thereby making the sensor 145 more accurate.

Referring to FIGS. 24-25, the target 412 includes a first curved region 414 and a second curved region 416 offset 180 degrees from the first curved region 414 such that the curved regions 414, 416 are aligned with the respective anvil lugs 120. The first curved region 414 is bounded by linear edges 418*a*, 418*b*, and the second curved region 416 is bounded by linear edges 420*a*, 420*b*. The target 412 has cut-outs or recesses 422 defined between the edges 418*a*, 420*a*, and the edges 418*b*, 420*b*, in a rotational direction of the anvil 34. As illustrated in FIG. 25, the linear edges 418*a*, 418*b*, 420*a*, 420*b* are positioned to pass over the sensor 145 as the anvil 34 rotates (e.g., in the direction of arrow A). Because the edges 418*a*, 418*b*, 420*a*, 420*b* are linear, a clear signal is produced when the edges 418*a*, 418*b*, 420*a*, 420*b* pass over the sensor 145. In contrast, if the sensor 145 were configured to detect the anvil lugs 120 directly, the curved, involute edges of the anvil lugs 120 may produce distortion and variance in the signal provided by the sensor 145. The target 412 therefore advantageously improves the accuracy of the sensor 145 and allows the controller 148 to more accurately measure the rotation of the anvil 34.

In the illustrated embodiment, the target 412 is integrally formed with the anvil 34 as a single piece. In other embodiments, the target 412 may be formed separately and coupled for co-rotation with the anvil 34 in any suitable manner. As illustrated in FIG. 21, the target 412 of the anvil 34 engages a rear end of a bushing 192 surrounding the anvil 34 to maintain the gap G between the target 412 and the anvil PCBA 132.

Figure 26:
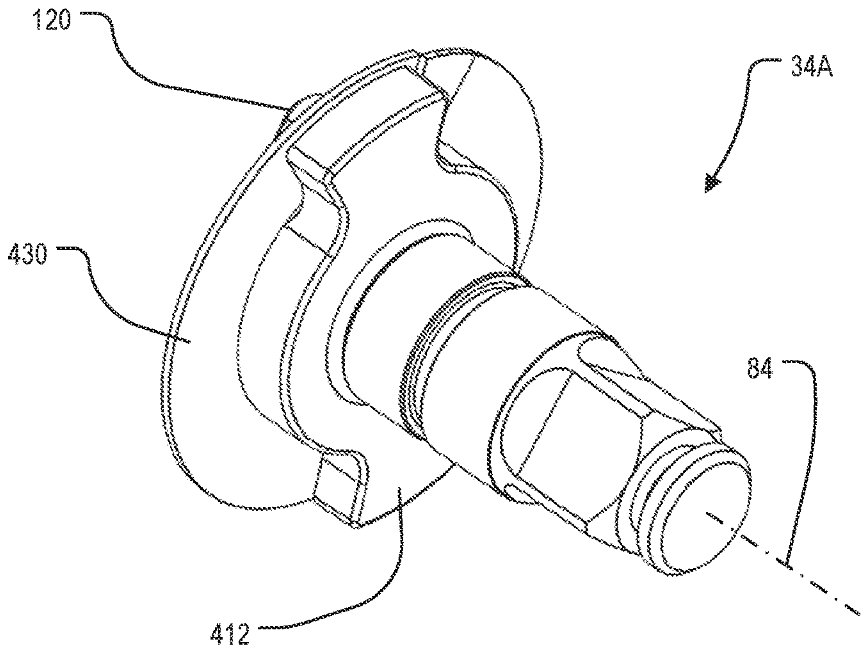
FIG. 26 is a front perspective view of an anvil according to another embodiment and usable with the impact tool of FIG. 21.
Figure 27:
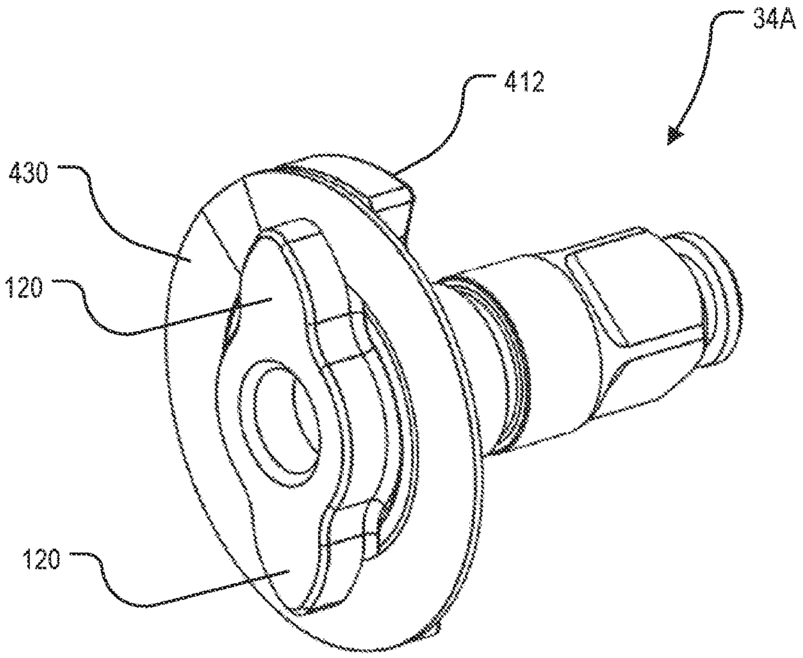
FIG. 27 is a rear perspective view of the anvil of FIG. 26.

Referring to FIGS. 26-27, an anvil 34A, which may be incorporated into the impact wrench 10 or 10A in place of the anvil 34, includes a shield 430 provided between the target 412 and the anvil lugs 120 in an axial direction of the anvil 34A. In the illustrated embodiment, the shield 430 is a split washer that is inserted into a gap or groove between the anvil lugs 120 and the target 412 to couple the shield 430 to the remainder of the anvil 34A.

Figure 28:
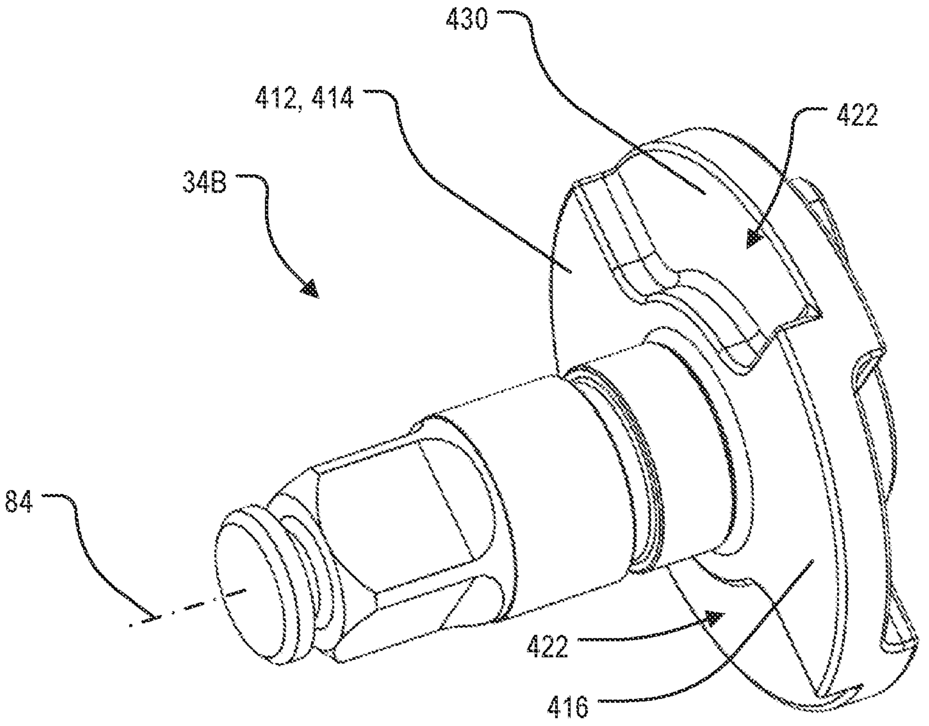
FIG. 28 is a front perspective view of an anvil according to another embodiment and usable with the impact tool of FIG. 21.
Figure 29:
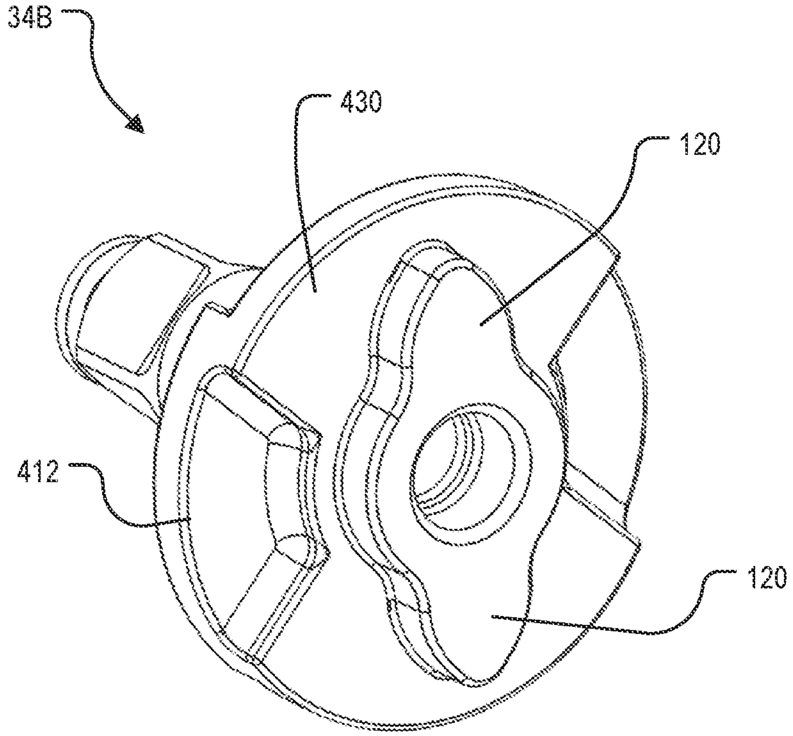
FIG. 29 is a rear perspective view of the anvil of FIG. 28.

Referring to FIGS. 28-29, an anvil 34B, which may be incorporated into the impact wrench 10 or 10A in place of the anvil 34 or 34A, includes a shield 430 integrally formed with the body of the anvil 34B. That is, the shield 430, target 412, and anvil lugs 120 are all integrally formed together as a single piece. In the illustrated embodiment, the shield 430 extends along the recesses 422 defined between the curved regions 414, 416 of the target 412 and is offset in a rearward axial direction from the target 412. The illustrated shield 430 has a curvature that matches the curvature of the target 412, such that the shield 430 and target 412 define a continuous circular perimeter when viewed in a plane normal to the axis 84.

The shields 430 provided on the anvils 34A, 34B described above with reference to FIGS. 26-29 may further improve the accuracy of the sensor 145 by blocking detection of the curved the anvil lugs 120.

With reference to FIG. 23, in the illustrated embodiment, the hammer PCBA 212 carries a hammer sensor (not shown). The hammer sensor may include one or more Hall-effect sensors, inductive sensors, acoustic sensors, and/or optical sensors to measure and determine an axial position of the hammer 104 (i.e. hammer translation), a rotational position of the hammer 104 (i.e. hammer rotation), and/or the occurrence of an impact between the hammer 104 and the anvil 34.

A set of wires 200 extends from the anvil PCBA 132 to the carrier 208 of the hammer PCBA 212. The carrier 208 then routes the wires 200 rearward and may direct the wires 200 toward the main PCBA 125 and the controller 148. The wires 200 may be joined by wires from an LED lighting assembly (not shown) coupled to the front end of the impact housing 30, as well as wires extending from the hammer PCBA 212.

In operation, the anvil 34 is axially biased forward by the spring 108 (via the hammer 104; FIG. 21), but the target 412 does not rotate against or otherwise contact the anvil PCBA 132 because the target 412 is spaced by the gap G from the anvil PCBA 132. The bushing 192 or optionally, as described in other embodiments herein, a thrust bearing, is configured to absorb the thrust load exerted on the anvil 34 during operation of the impact wrench 10.

The anvil rotation sensor 145 can detect each rotation of the anvil 34, or, in some embodiments, each fractional rotation of the anvil 34 (e.g., each half rotation of the anvil 34). The anvil rotation sensor 145 is in electrical communication with the controller 148, such that feedback from anvil rotation sensor 145 can be used to determine the impact frequency (e.g., impacts per minute) delivered by the anvil 34 to the fastener or workpiece, and/or the rotational speed of the anvil 34. The hammer sensor can detect an axial position of the hammer 104 (i.e. hammer translation), a rotational position of the hammer 104 (i.e. hammer rotation), and/or the occurrence of an impact between the hammer 104 and the anvil 34. The controller 148 is configured to receive feedback from the anvil rotation sensor 145 and the hammer sensor, which may be used to precisely control operation of the impact wrench 10A. For example, using the feedback from the sensors, the controller 148 may provide the impact wrench 10A with a plurality of torque and/or speed settings, fastener-specific settings, limits on the number of rotations of the anvil 34 per pull of the trigger 62, and the like.

Various features and aspects of the invention are set forth in the following claims.

What is claimed is:

1. A rotary impact tool comprising:
- a motor housing;
- an electric motor supported in the motor housing;
- a drive assembly for converting a continuous torque input from the motor to consecutive rotational impacts upon a workpiece, the drive assembly including
  - an anvil including an anvil lug, and
  - a hammer that is both rotationally and axially movable relative to the anvil, the hammer including a hammer lug for imparting the consecutive rotational impacts upon the anvil lug;
- a printed circuit board assembly including an anvil sensor that is configured to detect rotation of the anvil, wherein the printed circuit board assembly is spaced from the anvil to define an axial gap therebetween;
- an impact housing extending from a front end of the motor housing, wherein the drive assembly is at least partially supported within the impact housing, wherein the anvil includes a drive end extending from the impact housing; and
- a bushing coupled to the impact housing and surrounding the anvil.

2. The rotary impact tool of claim 1, wherein the printed circuit board assembly is located inside the impact housing.

3. The rotary impact tool of claim 2, further comprising a carrier supporting the printed circuit board assembly, wherein the carrier is coupled to a front interior wall of the impact housing.

4. The rotary impact tool of claim 3, wherein the carrier is heat-staked to the front interior wall of the impact housing.

5. The rotary impact tool of claim 1, wherein the printed circuit board assembly is a first printed circuit board assembly, and wherein the rotary impact tool further comprises a second printed circuit board assembly including a hammer sensor configured to detect at least one selected from a group consisting of: (a) translation of the hammer; (b) rotation of the hammer; and (c) occurrence of an impact between the hammer and the anvil.

6. The rotary impact tool of claim 5, further comprising a first carrier supporting the first printed circuit board assembly and a second carrier supporting the second printed circuit board assembly.

7. The rotary impact tool of claim 6, wherein the first carrier is coupled to a front interior wall of the impact housing, and wherein the second carrier is coupled to a bottom interior wall of the impact housing.

8. The rotary impact tool of claim 7, further comprising a plurality of wires electrically connected to the first printed circuit board assembly, wherein the plurality of wires extends along the second carrier.

9. The rotary impact tool of claim 5, wherein the first printed circuit board assembly and the second printed circuit board assembly are perpendicular to one another.

10. The rotary impact tool of claim 1, wherein the bushing engages the anvil to maintain the axial gap.

11. A rotary impact tool comprising:
- an impact housing;
- a drive assembly at least partially supported within the impact housing and configured to convert a continuous torque input to consecutive rotational impacts upon a workpiece, the drive assembly including
  - an anvil including an anvil lug, a drive end opposite the anvil lug, and a target disposed between the anvil lug and the drive end, and
  - a hammer that is both rotationally and axially movable relative to the anvil, the hammer including a hammer lug for imparting the consecutive rotational impacts upon the anvil lug; and a printed circuit board assembly including an anvil sensor that is configured to detect rotation of the anvil, wherein the printed circuit board assembly is spaced from the target to define an axial gap therebetween.

12. The rotary impact tool of claim 11, wherein the target includes a curved portion aligned with the anvil lug and bounded by a first linear edge and a second linear edge, wherein the first linear edge and the second linear edge are positioned to be detected by the anvil sensor.

13. The rotary impact tool of claim 11, wherein the anvil includes a shield disposed between the target and the anvil lug, wherein the shield is configured to inhibit the anvil sensor from detecting the anvil lug.

* * * * *